April 18, 1967   J. BELART ETAL   3,314,506
CALIPER TYPE, SPOT DISC BRAKE
Filed March 1, 1965   4 Sheets-Sheet 1

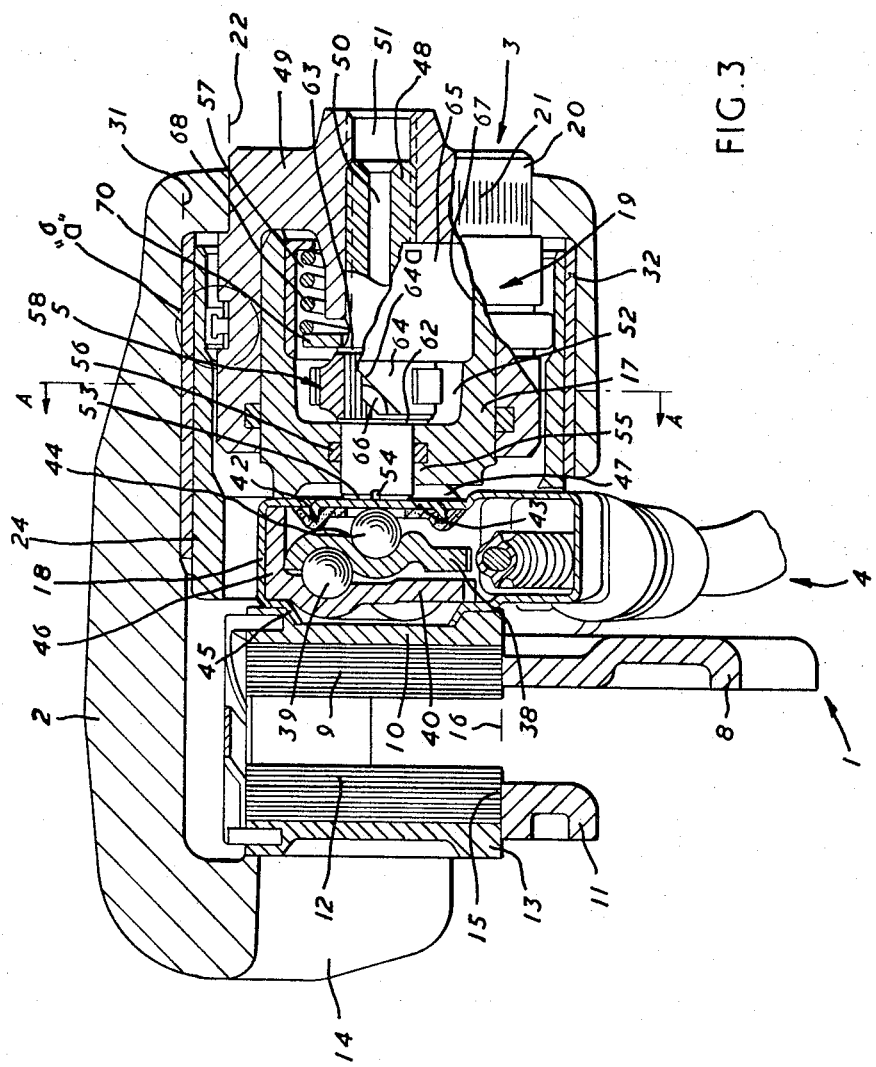

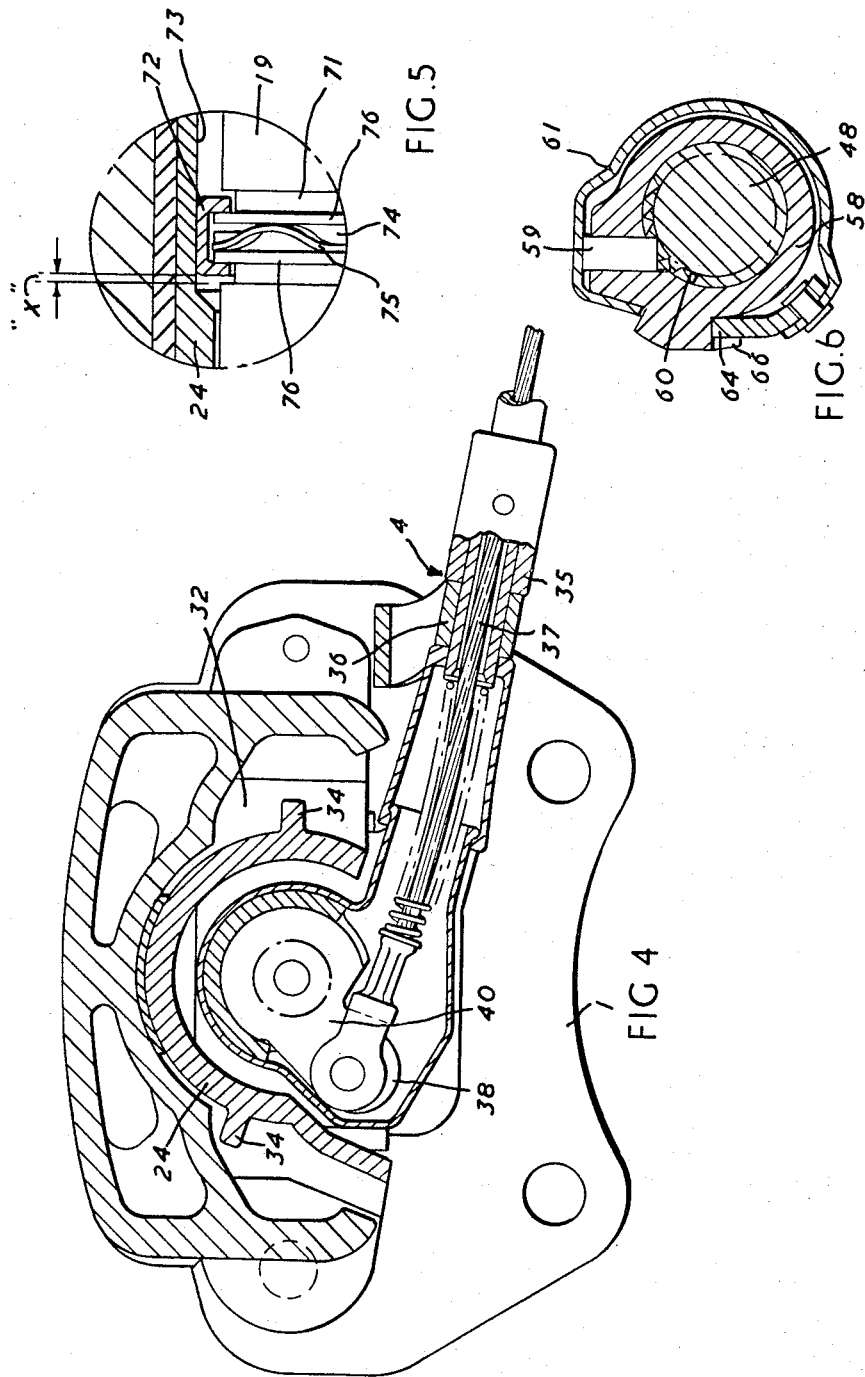

United States Patent Office 3,314,506
Patented Apr. 18, 1967

3,314,506
CALIPER TYPE, SPOT DISC BRAKE
Juan Belart, Walldorf, Fritz Ostwald, Buchschlag, and Karl Schlör, Biebesheim, Germany, assignors to Dunlop Rubber Company Limited, London, England, a corporation of Great Britain.
Filed Mar. 1, 1965, Ser. No. 435,840
7 Claims. (Cl. 188—73)

This invention relates to disc brakes.

One kind of spot-type disc brake comprises a caliper having a pair of limbs which straddle the periphery of a brake disc, one limb having a friction element fixed thereto and the other limb having a friction element which is movable into engagement with one side of the disc by a brake-applying mechanism associated with the limb. The caliper is movable axially so that the reaction thrust generated on the movable friction element when it engages the disc causes the associated limb of the caliper to move away from the disc and thus to draw the friction element fixed to its other limb into engagement with the opposite side of the disc.

One object of the present invention is to provide an improved disc brake of the above kind.

According to the invention a disc brake comprises a rotatable disc, a non-rotatable support, a caliper having a pair of limbs straddling a periphery of the disc, a pair of friction elements associated with the caliper one each side of the disc, and a brake-applying mechanism arranged to move one of the friction elements axially relative to the caliper and into engagement with the disc, the caliper being axially movable by reaction from the brake-applying mechanism to bring the other friction element into engagement with the opposite side of the disc and the support having an axially-extending guide sleeve on which the caliper is axially slidable.

Preferably, a disc brake in accordance with the invention comprises a rotable disc, a non-rotatable support at one side of the disc, a caliper having a pair of limbs straddling the outer periphery of the disc, a pair of friction elements associated wtih the caliper one on each side of the disc, and a brake-applying mechanism arranged to move one of the friction elements relative to the caliper towards the disc to engage one side of the disc, the caliper being movable axially on the support to move the other friction element with the caliper to engage the opposite side of the disc, the support having a portion which extends around the periphery of the disc to provide abutment surfaces to prevent movement of the friction pads parallel to the braking surfaces of the disc, and the support also comprising a guide sleeve extending parallel to the axis of the disc to provide a guide on which the caliper is axially slidable relative to the disc.

One embodiment of the invention will now be described, by way of example, with reference to the accompanying drawings, in which:

FIGURE 3 is an axial cross-sectional side view of the brake;

FIGURE 4 is a section at right angles to the axis of the brake, through a manual brake-actuating mechanism;

FIGURE 5 is an enlarged view of the detail "a" in FIGURE 3;

FIGURE 6 is a detail section view on the line A—A of FIGURE 3 showing an automatic adjustment device.

Figure 1:
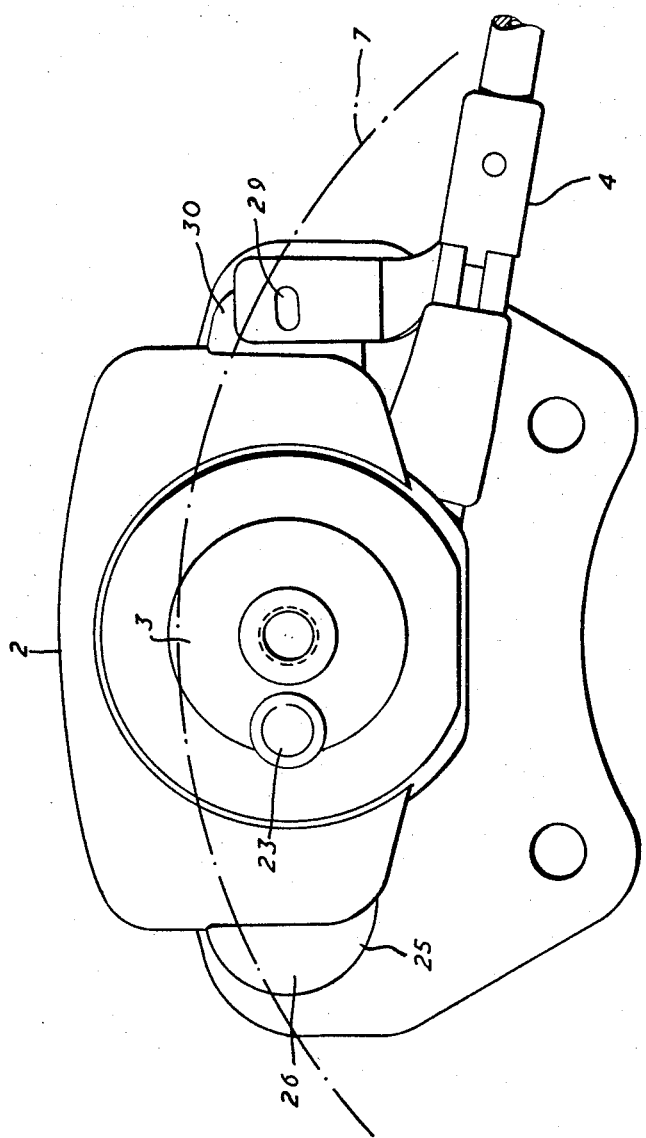
FIGURE 1 is an end view of a disc brake, seen in the axial direction.

The disc brake illustrated in the drawings comprises a support bracket 1, a caliper 2, a hydraulic brake-applying mechanism 3, a manual brake-actuating mechanism 4 and an automatic adjustment device 5. A retraction and centralising device 6 is provided to centralise the caliper 2 in the required axial position relative to the brake disc 7 after each brake application.

Figure 2:
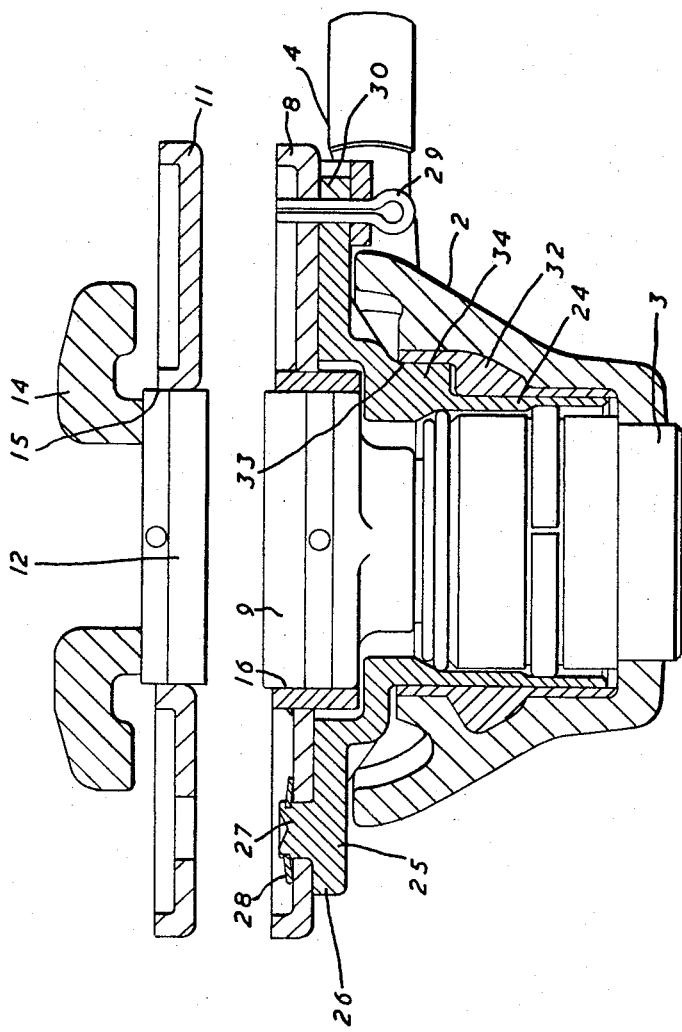
FIGURE 2 is a cross-section in plan of the brake.

The support 1 comprises a supporting plate 8 which extends alongside one side of the brake disc 7 and is bent over the outer periphery of the disc to provide a second supporting plate 11 on the opposite side of the disc. The plates 8 and 11 are formed with "windows" 16 and 15 respectively, the windows being open at the periphery and having side abutment surfaces (see FIGURE 2) which retain friction pads 9 and 12 respectively against movement parallel to the disc surface under the drag forces arising during braking. The friction pads 9 and 12 are provided, respectively, with metal backing plates 10 and 13.

The caliper 2 is axially slidably supported on a cylindrical guide sleeve 24 (see FIGURE 2) which is formed integrally with a flange 25. One wing 26 of the flange 25 is attached to the support 1 by a pin 27 and a springy washer 28 and the other wing 30 of the flange is attached to the support by a split pin 29. On removal of the split pin 29, the caliper can thus be swung clear of the disc to allow the brake pads to be changed.

The caliper 2 is formed with a bore 31 in which a rubber bush 32 is secured, e.g. by vulcanizing. The bush 32 has recesses 33 (see FIGURE 2) into which projections 34 of the guide sleeve engage to locate the caliper against rotation about the axis of the guide sleeve.

The hydraulic brake-applying mechanism 3 comprises a piston 17 which engages a capsule 18 containing the manual, mechanically operated, brake-applying mechanism 4. The capsule 18 transmits the thrust from the piston 17 to the friction pad 9. The cylinder housing 19 has a portion 20 of reduced diameter with splines 21 which fits into a bore 22 of the caliper 2 and is arranged so that in the normal mounting position on a vehicle the bleed screw 23 is at the highest point. The cylinder housing 19 transmits the reaction thrust from the brake-applying mechanism to the caliper 2 thus causing the housing to move axially on application of the brake until both friction pads are pressed against the disc.

The manual actuation device (see FIGURES 3 and 4) is operated by a cable 37 having a sheath 35 secured to an eye 36 in the brake support 1. The brake cable 37 is connected to a lever 38 which forms part of a ball-and-ramp thrust device comprising the lever 38, a thrust member 40, and three balls 39 which roll in ramped recesses between the lever 38 and thrust member 40. The lever 38, the balls 39 and the thrust member 40 are enclosed in a sheet metal capsule 18 which comprises a cover plate 43, and a diaphragm 42. A ball 44 is located centrally between the lever 38 and the cover plate 43 to transmit the thrust reaction from the ball-and-ramp thrust device to an adjustment bolt 48. The thrust from the manually-operated device is transmitted to the friction pad 9 by the thrust member 40, which also has an axially-extending lip 46 to transmit the pressure from a rib 47 on the forward face of the piston 17 during hydraulic operation of the brake.

The adjustment bolt 48 is secrewed into a screw-threaded bore in the end 49 of the cylinder 19 and is provided with a central channel 50 which connects the pressure chamber within the cylinder 19 with a connection 51 for a pipe (not shown) through which fluid can be supplied to the hydraulic brake-applying mechanism. The adjustment bolt passes through the end 55 of the piston 17 and a sealing ring 56 is provided to prevent the leakage of fluid at this point.

The bolt 48 has a face 53 which engages the cover plate 43 and a screwdriver slot 54 is provided in the bolt to enable the bolt 48 to be screwed into the cylinder when the friction pads are replaced. This is necessary since during the life of the friction pads the bolt 48 is gradually advanced by the adjustment device 5 and has to be returned to its original position before new pads can be fitted.

The adjustment device 5 comprises a collar 58 rotatably mounted in an axially fixed position between stops 62 and 63 on the bolt 48 and carrying a pawl 59 which is pressed by a spring 61 into engagement with ratchet teeth 60 formed on the bolt 48. The spring 61 is secured at one end to a reduced-diameter portion 64 of a bush 65 which is pressed tightly into a bore 67 of the piston 17. The portion 64 has an inclined cam face 64a which engages a cam follower 66 projecting from the collar 58 and the free end of the spring 61 engages the cam follower 66 to hold the cam follower in contact with the cam face.

A return spring 68 for the piston 17 is mounted in compression between an end flange of the bush 65 and a washer 70 mounted on the adjustment bolt against the stop 63.

The retraction and centralising device 6 comprises a springy split ring 72 of U-shaped cross-section confined in a groove 74 in the outer surface of the cylinder housing 19, the ring 72 being a friction fit in the bore 73 of the guide sleeve 24. The axial width of the groove 74 is greater than the width of the ring 72 by an amount "2X" (see FIGURE 5) where X is equal to the desired clearance between each friction pad and the disc.

Two rings 71 of L-shaped cross-section are located in the groove 74 and are urged away from one another by a prestressed corrugated annular spring 75, the radial flanges 76 of the rings 71 engaging the radial flanges of the ring 72 and the axially extending portions of the rings 71 engaging the respective walls of the groove 74.

The operation of the brake described above is as follows:

When the chamber 52 within the cylinder 19 is pressurised, the piston 17 is moved to the left as seen in FIGURE 3 and applies a thrust to the capsule 18 containing the manual brake-applying mechanism. The thrust is transmitted by the capsule 18 to the friction pad 9 which is pressed against the disc. The reaction thrust acting on the cylinder housing 19 moves the caliper 2 to the right to bring the other friction pad 12 into engagement with the disc, and the movement of the cylinder 19 relative to the ring 72 causes the flange 76 of the left-hand ring 71 to compress the spring 75.

If, as the result of friction pad wear, the movement of the cylinder 19 exceeds the predetermined clearance X the left-hand wall of the groove 74 engages the ring 72 and moves it along the bore 73 to a new position. On release of the brake, the spring 75 pushes back the left-hand ring 71 to the position shown in FIGURE 5 and thus moves the caliper to a position in which the required clearance X is created between the friction pad 12 and the disc. The retraction and centralising device 6 thus provides a centralising effect on the caliper and adjusts the retracted position of the friction pad 12 as the pad wears.

The adjustment device 5 makes a corresponding adjustment to the axial position of the adjustment bolt 48 as follows. When the piston 19 moves to the left on application of the brake the adjustment bolt 48 moves to the right and the resulting relative movement between the cam surface 64a on the portion 64 of the bush 65 and the cam follower 66 rotates the bush 58 in a clockwise direction as seen in FIGURE 6. If the pawl 59 is in engagement with a ratchet tooth, the bolt 48 is rotated so as to move the bolt to the left. At the same time the piston return spring 68 is compressed, and the spring 61 is stressed and tends to rotate the bush 58 in the opposite direction.

On release of the brake the spring 68 returns the piston until it engages the collar 62, and the bush 58 is turned back by the spring 61 so that the cam follower 66 remains in engagement with its cam surface 64a.

The adjustment device 5 acts in the manner described above to advance the bolt 48 towards the disc as the pads wear and thus to provide continuous automatic adjustment for the axial position of the reaction face 53 which engages the manual brake operating mechanism 4. The mechanism 4 is operated by a pull on the cable 37 which rotates the lever 38 causing the balls 39 to ride up the ramps of their recesses in the lever 38 and thrust member 40, thus causing an axial expansion of the mechanism 4 which applies a thrust to the friction pad 9 and to the reaction face 53 of the adjustment bolt to bring the brake into operation.

It will be noted that the automatic adjustment device 5 acts only on hydraulic application of the brake, while the retraction and centralising device 6 operates both when the brake is actuated manually and when the brake is actuated hydraulically.

The replacement of worn friction pads is carried out by removing the spit pin 29 and swinging the caliper and the guide sleeve together about the pivot 27 clear of the disc. The capsule 18 can then be removed and the friction pads withdrawn. A screwdriver is then applied to the slot 54 in the bolt 48 to screw the bolt and thus the piston 17 back into the cylinder 19.

The brake described above has the advantages that the caliper is supported so as to be freely axially slidable on the guide sleeve without the risk of jamming, and the retraction and centralising device, automatic adjustment device and manual operating mechanism are conveniently located in an assembly which is compact and protected against the entry of dirt and moisture.

Having now described our invention, what we claim is:

1. In a disc brake including a rotatable disc, the structure comprising a caliper having a pair of limbs straddling a periphery of said disc, a pair of friction elements associated with the caliper one on each side of the disc, a nonrotatable support for the caliper having an axially-extending guide sleeve on one side of said disc proportioned to fit within a cylindrical surface defined by a portion of said caliper and thereby providing a support surface on which said caliper is axially slidable, and a hydraulic brake-applying mechanism fixed to one limb of the caliper and axially movably located within said guide sleeve, said brake-applying mechanism being arranged to move one of the friction elements axially relative to said caliper and into engagement with said disc, reaction on the brake-applying mechanism serving to move said caliper to bring the other friction element into engagement with the opposite side of the disc.

2. A disc brake comprising a rotatable disc, a nonrotatable support having an axially extending guide sleeve providing bearing surfaces, a caliper having a pair of limbs straddling a periphery of the disc and supported for axial movement on the outer bearing surface of said support provided by said sleeve which extends across said caliper, a pair of friction elements associated with the caliper on each side of the disc, and a brake-applying mechanism disposed at least partially within said sleeve for bearing support thereon and arranged to move one of the friction elements axially relative to the caliper and into engagement with the disc, the caliper being axially movable by reaction from the brake-applying mechanism to bring the other friction element into engagement with the opposite side of the disc.

3. The disc brake structure in accordance with claim 2 wherein said nonrotatable support includes a flange providing a support pivot for said guide sleeve, and a removable fastening which is displaceable to provide for swinging movement of both said guide sleeve and caliper to a position which is clear of said disc.

4. The disc brake structure in accordance with claim 2 wherein said brake-applying mechanism is hydraulically operated and axially movable in said guide sleeve.

5. The disc brake structure in accordance with claim 2 including a combination retracting and centralising means acting against said housing to effect retraction following a brake application and is disposed between said brake-applying mechanism and said guide sleeve.

6. A disc brake in accordance with claim 2 wherein said brake-applying mechanism is fixedly secured to said caliper and is axially movable within said guide sleeve, and mechanically-operated brake-applying means for effecting operation of said brake and located between said brake-applying means and said movable friction element.

7. The disc brake structure in accordance with claim 6 including an automatic adjuster mechanism for effecting movement of the movable members of said brake-applying mechanism to compensate for wear of said friction elements.

References Cited by the Examiner

UNITED STATES PATENTS

| | | | |
|---|---|---|---|
| 2,966,964 | 1/1961 | Brueder | 188—73 |
| 3,051,272 | 8/1962 | Burnett | 188—73 |
| 3,114,436 | 12/1963 | Larson | 188—73 |
| 3,182,754 | 5/1965 | Hahm et al. | 188—73 |

FOREIGN PATENTS

| | | |
|---|---|---|
| 1,273,257 | 8/1961 | France. |
| 717,350 | 10/1954 | Great Britain. |

MILTON BUCHLER, *Primary Examiner.*

FERGUS S. MIDDLETON, *Examiner.*

G. E. A. HALVOSA, *Assistant Examiner.*